United States Patent [19]

Hauck

[11] Patent Number: 4,779,079
[45] Date of Patent: Oct. 18, 1988

[54] MULTI-PURPOSE COMPUTER UTILITY ARRANGEMENT

[76] Inventor: Lane T. Hauck, 5346 Bragg St., San Diego, Calif. 92122

[21] Appl. No.: 758,109
[22] Filed: Sep. 6, 1985
[51] Int. Cl.⁴ .............................................. G08C 1/00
[52] U.S. Cl. .................................. 340/706; 340/711; 364/900
[58] Field of Search ........... 340/706, 709, 711, 365 R, 340/710, 825.19, 365 S; 178/18, 26 R, 26 A, 17.5, 17 C; 400/87, 88, 89; 364/900, 200

[56] References Cited

U.S. PATENT DOCUMENTS

| | | |
|---|---|---|
| 3,831,147 | 8/1974 | Kafafian .............................. 400/87 |
| 3,854,131 | 12/1974 | Vanderheiden et al. ............. 340/710 |
| 3,895,185 | 7/1975 | Ramsey ............................ 178/26 R |
| 4,007,443 | 2/1977 | Bromberg et al. ................. 340/365 S |
| 4,121,283 | 10/1978 | Walker ................................. 340/709 |
| 4,493,992 | 1/1985 | Geller ................................. 340/709 |
| 4,562,304 | 12/1985 | Ward et al. ............................ 178/18 |

OTHER PUBLICATIONS

Nelson, Peter J., "The MOD Keyboard," Byte, Aug. 1983, pp. 7-17.

Primary Examiner—John W. Caldwell, Sr.
Assistant Examiner—Alvin Oberley
Attorney, Agent, or Firm—Bernard L. Kleinke

[57] ABSTRACT

A computer accessory is disclosed that includes a module. The computer accessory comprises a module having an input port and an output port and a microprocessor circuit that generates an output signal in keyboard character code at the output port that is of selected correspondence to an input signal in keyboard character code received at the input port. Coupling components enable insertion of the module in a data transmission path between a selected keyboard and an associated computer system.

18 Claims, 4 Drawing Sheets

MULTI-PURPOSE COMPUTER UTILITY ARRANGEMENT

TECHNICAL FIELD

This invention relates generally to a multi-purpose computer utility arrangement, and it more particularly relates to a programmable keyboard character code generating arrangement, which may be coupled between a keyboard and an associated computer system to provide a variety of utility functions.

BACKGROUND ART

The advance of computer technology has placed very powerful, compact, keyboard equipped central processing units within reach of us all. As we take our place in front of one of these keyboard driven computers and start typing in data and commands, all sorts of new uses and desirable time saving features come to mind, ideas that have previously required expensive system modifications or additions to implement.

For example, when entering data or commands to a central processing unit, it is often necessary to repeat a pattern of keystrokes that has already been entered. This may be required, for instance, to initialize a program, to set default settings in a word processing program, or to perform some other often repeated function. The tedious process of performing such keyboard functions is simplified in some systems by providing a utility program that can be called by striking a designated combination of keys. Once called, the utility program generates the desired keystroke pattern without further operator assistance.

Although this technique may be satisfactory for many applications, it suffers from certain drawbacks. For example, in some systems, there is insufficient hardware or software capability to support the utility programs so that expensive memory or software must be added to the central processing unit. This may mean using one of the limited number expansion slots available, and the use of such for a utility program may not be desirable. Alternatively, expensive peripheral memory devices must be employed, and doing this may mean not only increased cost, but also the elimination of some other desired function. Sometimes the utlity program resides in the computer random access memory (RAM), which is generally unavailable or undesirable for such use. Moreover, in some applications, the entire keyboard is required by the operating system or application software, so that no keys are available for calling the utility program.

Consequently, as it is desirable to have a convenient utility arrangement which could either be an original equipment installation, or could be conveniently connected into an existing computer as an accessory. As an accessory, it would not require the use of an expansion slot nor require system modification or altered software. However, it would nevertheless operate under keyboard control to provide a selected keystroke pattern without taking up additional central processing unit memory and without being limited in those cases where the whole keyboard is in use.

A related example of increased functionality often desired in keyboard driven systems, is where operating systems and applications prompt the operator to enter the time and date when the program is first initialized. The task of entering the appropriate data often becomes a tedious one that the operator desires to avoid, and entry of the correct time and date is either purposely overlooked or begrudgingly done.

Such an utility arrangement should facilitate the entry of the time and date into the system in response to the system prompt. Even though some computer systems employ real time clocks, they are not always compatible with the software being used so that the job must nevertheless be done by the operator. Consequently, it is desirable to have such an arrangement which functions to provide the correct time and date with a minimum of operator attention or effort required.

Yet another example of functionality that is often desired in an existing computer system, is related to the inability of some handicapped and disabled operators to easily manipulate a keyboard. Such operators can often do little more physically than to manipulate a single switch with a paddle placed in their mouth or with some other movable body member. Special computers with complex software are required, and such costly equipment is thus not widely used. If there were some way that an existing conventional keyboard driven computer system could be operated with a single switch placed near such an operator, it would enable far more handicapped people to use a computer, especially if the utility arrangement were relatively inexpensive to manufacture. So, in these cases, it is desirable to have such a utility arrangement, which would also enable the entry of data and commands to an existing computer system by the manipulation of a single switch advantageously placed near the operator.

As yet another example of a utility procedure frequently required by computer users, consider the incompatibility of two word processing programs. Files created on one can often be used with the other only after first converting the files into the proper format. In some instances conversion programs simply do not exist. They would be expensive and require continuous updating to allow for changes made to word processing programs. As a result, there is no convenient way available to inexpensively transfer files between incompatible word processing programs. The file usually has to be recreated, resulting in the expenditure of unwanted time, and in operator frustration.

Therefore, it would be highly desirable for such a utility arrangement also to enable the use of files or other data created with an otherwise incompatible program. Consequently, it is desirable to have such an arrangement which would also enable data created in one format to be inputted conveniently into a system using otherwise incompatible software.

In addition to all of the above, it is important to be able to provide such a new and improved multi-purpose utility arrangement, to facilitate all of the foregoing functions, without modifying the software or hardware of an existing computer system, and without using limited expansion capabilities thereof. Consequently, it is desirable to have an either such an original equipment utility arrangement, or such a utility arrangement in the form of inexpensive, plug compatible device which is attachable to an existing computer system without the need for hardware or software modification or use of preplanned system expansion features.

DISCLOSURE OF INVENTION

Therefore, the principal object of the present invention is to provide a new and improved multi-purpose computer utility arrangement for providing the desired additional utility functions for a new or existing keyboard driven computer system, without hardware or software modification and without using expansion slots or other preplanned means of system expansion.

Another object of the present invention is to provide such a new and improved utility arrangement, which can also be used for enabling the use of otherwise incompatible files or data, and which facilitates greatly the use of existing computer systems by handicapped people by the utilization of relatively inexpensive to manufacture equipment.

Briefly, the above and further objects of the present invention are realized by providing a multi-purpose computer utility arrangement, which may form a portion of a data transmission path between a selected keyboard and the associated computer system.

The multi-purpose utility arrangement includes a module having an input port and an output port. The module includes a microprocessor circuit for generating an output signal in keyboard character code at the output port. The keyboard character code corresponds to an input signal received at the input port.

Thus, when the arrangement is used as an accessory item for an existing computer system, the module is coupled between an existing keyboard and an existing central processing unit in which the keyboard is otherwise connected. In this manner, the arrangement can be easily and externally attached to the computer system. By suitably programming the microprocessor circuit, the existing keyboard can be used to command the microprocessor unit to output selected keyboard character code, including such code representative of keystroke patterns following the input keystroke pattern, as well as other keystroke patterns.

In one form of the invention, a real time clock and appropriate programming causes the generation of the keyboard character code necessary to enter the correct time and date, when prompted to do so. Such is accomplished with very little operator intervention.

In another form of the invention, a second input port is provided for receiving a second input signal in print code, such as standard ASCII print code. A second circuit generates an output signal in keyboard character code for the computer processor unit, corresponding to the ASCII code. Thus, a printer cable connected from a source of ASCII code can be connected to the second input port to supply data formatted by one program, such as a word processing program. Suitable programming in the microprocessor develops an output keyboard code suitable for causing another word processing program to generate a corresponding file in its own format. Thus, the standard ASCII print code of one program is converted automatically to keyboard character code for inputting to another program, which may be of a different format from the first program.

Yet another form of the same invention relates to a third input port for receiving a third input signal in Morse code or any other suitable "on-off" code. A third circuit generates an output signal in keyboard character code indicative of Morse code or any other suitable "on-off" code. A single switching device can be used by a handicapped or otherwise disabled operator, to input Morse code. Suitable programming of the arrangement is used to develop corresponding output keyboard characters for coupling to the central processing unit in place of the keyboard signals generated by a conventional keyboard.

Thus, without modifying the existing computer system or using limited system expansion features, this invention can provide an accessory capable of the foregoing added functionality desired. Furthermore, the multi-purpose utility arrangement of the present invention may be programmed to perform many other functions such as functioning as a keystroke recorder, as well as others. All of the foregoing features are performed by such an arrangement, which is relatively inexpensive.

BRIEF DESCRIPTION OF DRAWINGS

The above-mentioned and other objects and features of this invention and the manner of attaining them will become apparent, and the invention itself will be best understood, by reference to the following description of an embodiment of the invention taken into conjunction with the accompanying drawings, wherein.

DETAILED DESCRIPTION

Figure 1:
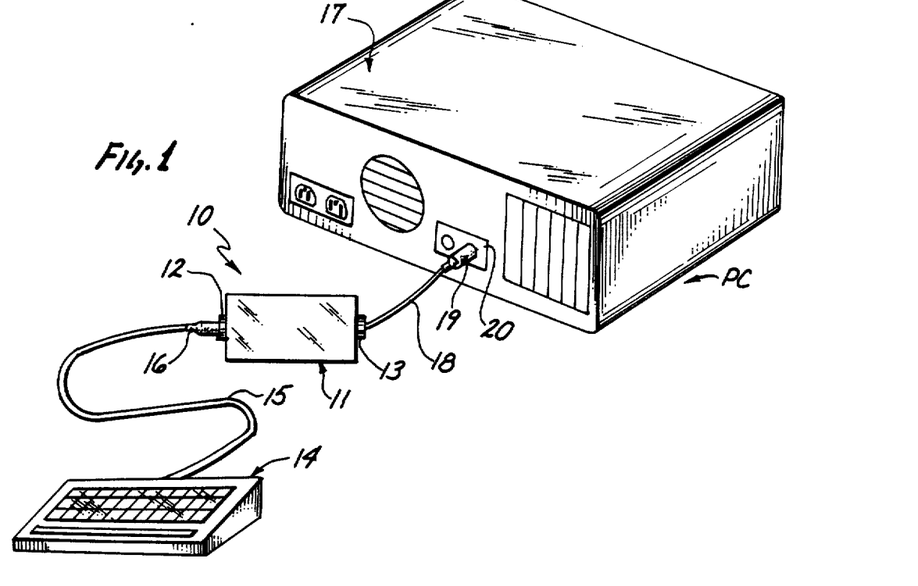
FIG. 1. is a pictorial, partly schematic view of a multi-purpose computer utility arrangement constructed in accordance with the invention, with the arrangement being in the form of an accessory shown coupled between an existing keyboard and the associated computer system.

Referring now to the drawings, and more particularly to FIG. 1 thereof, there is shown a multi-purpose computer utility arrangement 10, which is constructed in accordance with the present invention. The arrangement 10 is in the form of an accessory item. However, it is to be understood that the arrangement 10 can also be employed as a factory installed arrangement for new systems.

The arrangement 10 generally comprises a module 11 having an input port connector 12 and an output port connector 13. A conventional keyboard 14 of a personal computer (PC) is connected via cable 15 and keyboard connector plug 16, to the input port 12. An output port 13 is connected to a central processing unit 17 of the computer PC, by cable 18, which has a plug 19 interengaging with the back panel keyboard socket 20 in place of a direct connection from the keyboard. The computer PC, may be a conventional personal computer, such as the model sold under the tradename "IBM PC" by IBM Corporation of New York.

Thus, the module 11 serves as a portion of a data transmission path between the keyboard 14 and the central processing unit 17. In this position, the module can be suitably programmed and controlled by commands entered with the keyboard, to output keyboard character code to the central processing unit 17 to emulate the keyboard character code generated by the keyboard itself. By generating keyboard character code, a vast variety of functions can be performed by the arrangement 10.

A selected keyboard character code can be generated by the arrangement 10, and such code exactly corresponds to a selected string of keystrokes (keystroke pattern) on the keyboard 14, caused by an operator continually pressing a selected key or keys on the keyboard. In one mode of operation, the arrangement 10 can be designed and programmed to output keyboard character code that is the same as that generated by the keyboard. In another mode, the arrangement 10 can be designed and programmed in conjunction with a real time clock to enter the correct time and date in response to an operator depressing a selected key or combination of keys (e.g., depressing the "space bar" twice), on the keyboard.

These, and other functions performable by the entry of the appropriate keystroke pattern can be accomplished readily. For example, some computer systems keep daily backups of working files. To be perfectly backed up, the changes to the files should be recorded and saved until the disk backup operation can be performed. By adding a large memory system (e.g., 256 Kilobytes), not shown, to the module 11, all keyboard entries to a program can be stored by the module. If there is a catastrophic system failure, such as a power outage, the system can be repowered, and the keystrokes can be "played back" into the system automatically by the arrangement 10. In this manner, the computer processor unit responds to the code generated by the module 11, as if the operator has retyped exactly what was entered into the computer PC earlier (and subsequently lost).

Some software programs allow the user to perform a "macro" function, whereby an arbitrary sequence of keystrokes are generated by a single function key. Then, when the function key is pressed, the string is "sent" to the program. For example, a particular sequence of keystrokes might set up the document format for a word processing program. The module 11 enables the user to perform this function for any program, including those which have not provided a macro function. The user first causes the module to enter a "learn" mode, and then types the desired sequence of keys from the keyboard. The user then assigns the key sequence to a single key or keys. The module is then placed into an "operate" mode, and whenever it detects the depression of the assigned key or keys, it would send the predefined keyboard code corresponding to the series of keystrokes.

The module can be programmed for security in advance to make the electrical connection between the output of the module and computer only when a predefined sequence of keys is typed at the keyboard. That is, keyboard character code would be generated by the module 11 for transmission to the central processing unit, only if the right code is first entered with the keyboard. Without the predefined sequence of keys being depressed, the keyboard remains disconnected from the computer in the sense that keyboard character code the keyboard to the module results in no keyboard character code being coupled to the central processing unit. Consequently, the computer is inoperable unless and until a preassigned access code is entered by the keyboard being operated by an authorized user.

Many computer users are concerned about the placement of keys on their keyboard. If it is desired to move a key from one position to another, the module can intercept the codes of the moved keys and translate the codes to reflect the new key positions.

Figure 2:
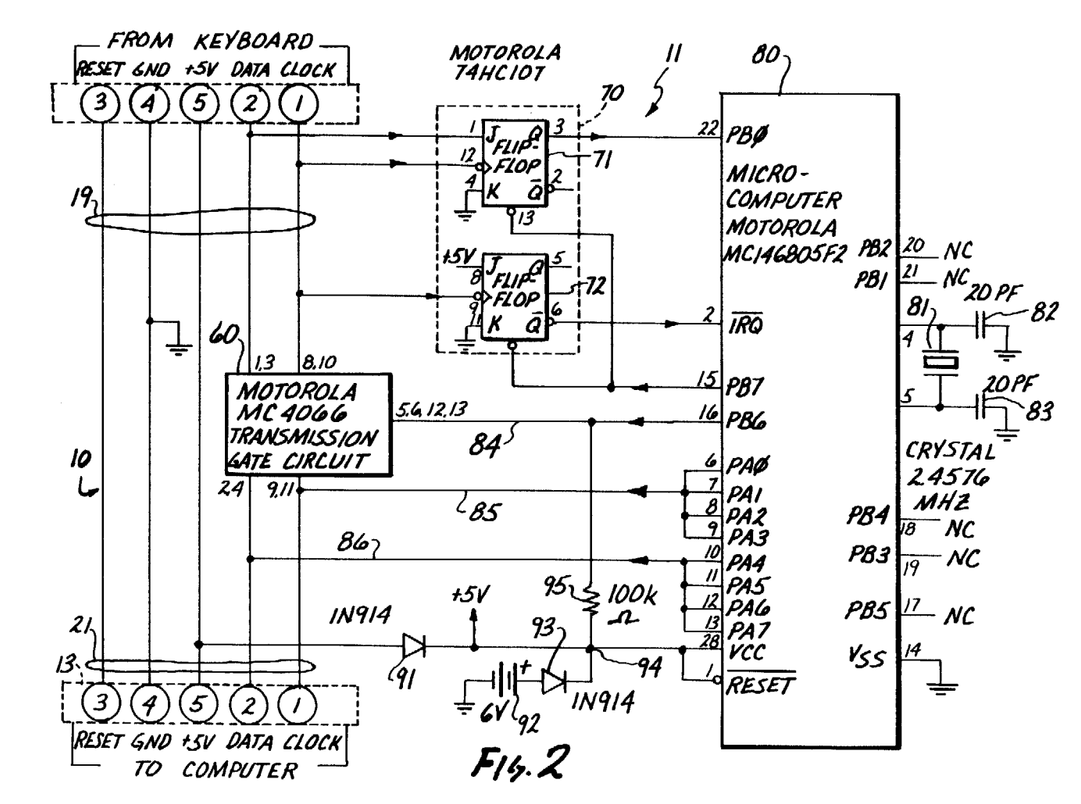
FIG. 2 is a schematic circuit diagram of the arrangement of FIG. 1.

Referring now to FIG. 2, the module 11 circuit couples control and signal lines 19 received from the keyboard 14 (FIG. 1) at the input port 12 to corresponding control and signal lines 21 at the output port 13 for connection to the central processing unit 17 (FIG. 1). Sensing circuitry senses the DATA and CLOCK signal supplied from the keyboard and couples it to a micro-computer circuit 80. The micro-computer circuit 80, in turn, either activates a transmission gating circuit 60 so that the signals from the keyboard are passed directly to the output port, or it deactivates the gating circuit 60 and supplies, instead, newly generated character code to the output port 13.

Power supplied from the central processing unit 17 (FIG. 1) to the keyboard 14, is also supplied to the module 11 for powering it and a backup battery power supply is included to enable the micro-computer 80 to continue providing a real time clock function, even though the central processor power is disconnected or turned off.

Considering first the coupling between the input port and output port, FIG. 2 shows the five lines 19 received at the input port from the keyboard 14 (FIG. 1). These are the usual five lines employed by conventional keyboards. They include a CLOCK signal line, DATA signal line, and a RESET signal line, along with a FIVE-VOLT power line and a GROUND line. The RESET signal is coupled directly from the input port 12 to the output port 13. The FIVE-VOLT line and the GROUND line are also coupled directly from the input port to the output port. The GROUND line is connected as module ground, and the FIVE-VOLT line is tapped for module power.

The CLOCK and DATA signal lines are coupled through the transmission gating circuit 60, so that they can be decoupled when desired in order to enable coupling of a keyboard character code, generated by the micro-computer, for supplying it to the microprocessor unit.

A flip-flop component 70 (Motorola 74HC107 or equivalent) includes two conventional JK flip-flops 71 and 72. The CLOCK signal is supplied to the clock inputs of the two flip-flops, the K inputs are grounded, and the DATA signal is supplied to the J input of flip-flop 71. The FIVE-VOLT signal is connected to the J input of flip-flop 72. The Q output of flip-flop 71 is coupled to the micro-computer 80 as its input terminal 22, as a data input and the Q output of the flip-flop 72 is connected to the input terminal 2 of the micro-computer. Finally, the RESET input of both flip-flops are connected to a micro-computer terminal 15 to enable resetting the flip-flops under computer control.

Micro-computer 80 receives the DATA and CLOCK signals from flip-flops 71 and 72, and according to the keystroke pattern represented by the data, either to cause the gating circuit 60 to supply the input signals from the keyboard to the output port 21, or to cause the gating circuit to interrupt temporarily the transmission path between the keyboard 14 and the processor unit 17. Thus, in the latter situation, the micro-computer 80 causes desired keyboard character code to be supplied to the output port 21. In this manner, the various foregoing mentioned functions may be implemented.

Crystal 81 provides the microcomputer 80 clock function, and it is connected across terminals 4 and 5 of micro-computer 80. A pair of capacitors 82 and 83 are also connected between ground and the respective terminals 4 and 5.

Line 84 from terminal 16 of the micro-computer to gating circuit 60 selectively activates or de-activates the gating circuit. When activated, the gating circuit passes the signals received at the input port 12 from the keyboard to the output port 21. When de-activated, the gating circuit de-couples the signals and enables micro-computer 80 to couple its own generated data and clock signals via lines 85 and 86 to the output port 21.

The module 11 is powered by the FIVE-VOLT signal received at the output port through diode 91. Thus, the arrangement 10 does not need to be separately powered. The circuit also includes a 6-volt battery 92, one terminal of which is grounded and the other terminal which is coupled through diode 93 to a point 94, for powering the module 11. Point 94 is also connected through current-limiting resistor 95 to gating circuit 60 to maintain the component 60 in an active state, until deactivated by micro-computer 80.

The micro-computer 80 is a well known design with standard microprocessor features including one K (one thousand bytes) of ROM, 64 bytes of RAM, 20 I/0 lines and built in crystal oscillator, timer, and interrupt system. It is fabricated with CMOS Technology, making it well suited to the battery powered time keeping application. The Motorola MC146805F2 micro-computer is fully described in tw Motorola semi-conductor publications; "Single-Chip Mcrocomputer Data", Publication No. DL132R1, 1984 Edition, pages 3-910 through 3-934, and "M6805 HMOS/M146805 CMOS Family Microcomputer/Microprocessor User's Manual", Publication No. M6805UM (AD2), 1983 Edition.

Transmission gate 60 is of the standard CMOS 4066 type. J-K flip-flop 71 uses the negative transition of the keyboard CLOCK signal to latch the keyboard data, before presenting it to micro-computer 80, and flip-flop 72 uses the negative transition of the keyboard CLOCK signal to provide a latched interrupt request signal to the micro-computer 80. The reset signal from pin 15 of micro-computer 80 clears both flip-flops, after the keyboard data has been accepted by the microcomputer.

In operation, the micro-computer sends time and date information to the output port, only under certain specific circumstances. Although it may be desired to send time and date information to the output port 13 when a selected keystroke pattern is received at the input port 12, time and date information is not sent each time that keystroke pattern is received. Many criteria may be used to determine when time and date information is sent. In one referred technique, there are two sequences of events to cause the micro-computer to send time and date keystroke patterns to the output port 13. In the first sequence, immediately after the system is turned on, if the first key struck by the user is the space bar (not shown) in response to the "enter new date" prompt, appearing on the screen of the unit 17, the micro-computer activates line 84 to disconnect the keyboard from the computer, and the data is sent in the correct format by transmitting the following sequence of keyboard character code to the output port:

<bs>mm-dd-yy <cr>

Where "<bs>" is the keyboard signal for the backspace key, "mm" is the keyboard signal for the two digit month, "dd" is the keyboard signal for the two digit day, "yy" is the keyboard signal for the two digit year, and "<cr>" is the keyboard signal for the carriage return key.

The backspace signal is sent to cancel the effect of the space bar being pressed. Without it, the central processing unit would otherwise receive the date information preceded by a space character, which would not be considered a valid date.

Once this sequence has been sent from the module via the central processing unit 17 and the output port 13, the micro-computer activates control line 84 to re-connect the keyboard to the processor unit. In this regard, lines 1 and 2 are re-connected to re-establish the data transmission path between the input port and the output port.

If the next key pressed is the space bar (in response to the "enter new time" prompt), the micro-computer again activates the switch line 84 to disconnect the keyboard from the unit 17, and sends the following sequence of keycodes:

<bs>hh-mm-ss <cr>

Again, the backspace is used to negate the effect of the space bar. The symbol "hh" represents the hours, "mm" the minutes, and "ss" the seconds of the correct time.

After this sequence is sent, gating circuit 60 is again activated to reconnect the keyboard 14 to the unit 17.

In the second sequence, it is possible, when using Disk Operating System software on certain central processing units, to set the time and date by typing the commands "time" or "date", and then typing the correct time or date numbers. The module 11 thus also sends time and date information when it detects the following sequences:

1. The user has typed "time <cr> <sp>". In this case the time is sent as described previously.
2. The user has typed "date <cr> <sp>". In this case the date is sent as described previously.

The time and date are stored in the micro-computer by means of a time keeping program. Alternatively, various integrated circuits are available for the purpose of time keeping.

A requirement of any time/date clock is to be able to set a particular time and date. This is accomplished in this design in a manner which is natural to many personal computer users. The user simply performs the steps necessary to set the time and date in the personal computer from the keyboard, and the module 11 sets its internal clock according to the values typed at the keyboard.

For example, if the user "time <cr> 12:25:34 <cr>" while the Disk Operating System program is in use, the internal timer value inside the personal computer is set to 12:24:34. Since the micro-computer in the module reads the same keycodes from the keyboard that are sent to the computer, it can determine that a valid time has been set, and it can then set its internal clock accordingly.

Only the correct sequence of keystrokes and a valid time causes the micro-computer clock to be set.

In a similar manner, when a user types "date <cr>mm-dd-yy <cr>," the micro-computer in the module sets its internal "calendar" accordingly.

The program in the module's micro-computer checks time and date information for validity before allowing them to set its internal clock. For example, a time of "25:30" would not be allowed, nor would a date of "2-29-87" since 1987 is not a leap year. This error checking is not mandatory, but it improves the design and keeps it consistent with the goal of providing mistake tolerant, easy to use hardware.

Appendix A, which is incorporated herein by this reference, contains a software listing for this real time clock application. The syntax shown in the listing is compatible with the 6805 Assembler available from S-C Software, Dallas, Texas, and described in the manual "S-C Macro Assembler".

Figure 3:
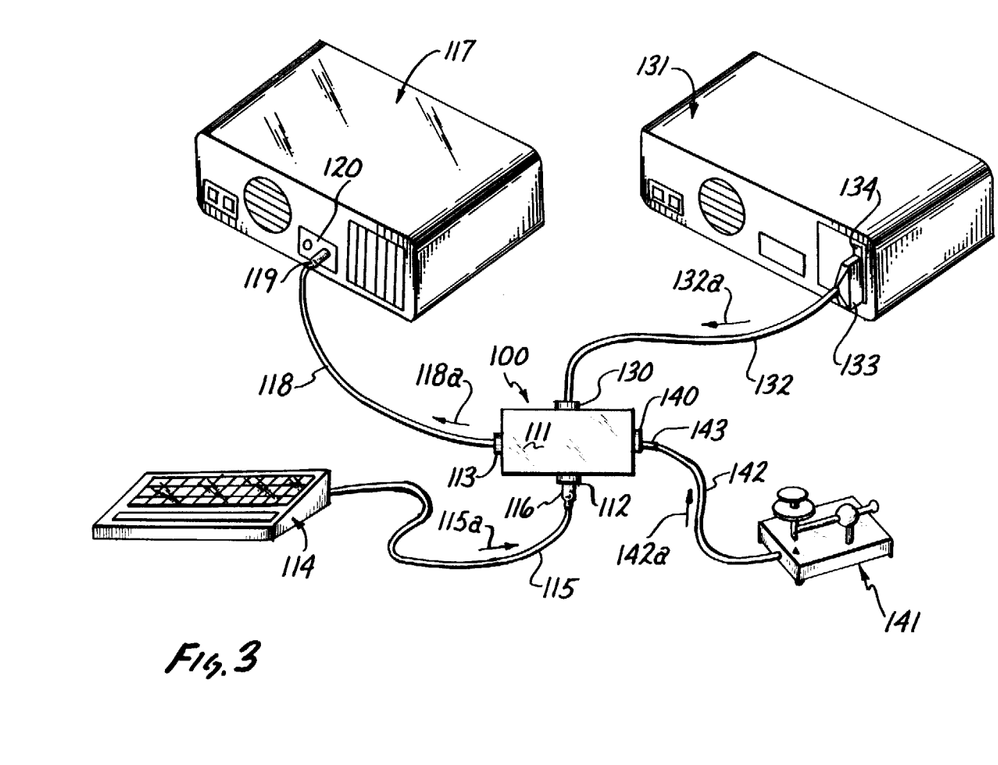
FIG. 3 is a pictorial view of an another multipurpose computer utility arrangement, which is also constructed according to the present invention, and which receives ASCII print code from a second computer output terminal for enabling the usage of otherwise incompatible data, and receives Morse code or from a separate operator controlled switch.

Turning now to FIG. 3, there is shown another multi-purpose computer utility arrangement 100 constructed in accordance with the invention, with reference numerals being increased by 100 over reference numerals designating similar components for the arrangement 10 of FIG. 1.

The arrangement 100 includes a module 111 having an input port 112 and an output port 113. Input port 112 is connected to keyboard 114 by cable 115. The cable has a plug 116 which connects into the input port connector 112. Arrow 115A designates the flow of data from the keyboard to the module.

Output port connector 113 is connected to central processing unit 117 by cable 118 which includes a keyboard plug 119 that mates with the back panel keyboard connector 120 of the central processing unit. Arrow 118A shows the flow of data from the module to the central processing unit.

The arrangement 100 also includes a second input port connector 130 for facilitating the transfer of data files of one format from the unit 131 to the unit 117, storing programs of another format, so that the unit 117 can utilize the non-compatible data. This second input port connector is connected to a second central processing unit 131 by cable 132. The cable has a plug 133 that connects to the back panel printer input port connector 134 of the central processing unit 131. Arrow 132 shows the flow of print code data from the printer output port to the module.

The arrangement 100 also includes a third input port connector 140 for Morse code or any other suitable "on-off" code data. This input port connector is connected to an external single-pole-single-throw switch 141 by cable 142. Cable 142 includes a standard miniature phono plug that plugs into the third output connector 140, and arrow 142 shows the flow of data from the switch 141 to the module.

Thus, the arrangement 100 has the structural components necessary to interconnect the module with the printer output port of a second central processing unit and external switch 141. These may in turn be used to input a second input signal in print code, such as standard ASCII code, from the second central processing unit or Morse code or any other suitable "on-off" code from the external switch. And, additional circuitry and suitable programming converts these signals into keyboard character code suitable for inputting into the first central processing unit.

This provides a whole new level of added functionality. For example, arrangement 10 enables the transfer of text files between any two computers even though the file format may be otherwise incompatible. The module receives data from the printer output port of a sending computer in ASCII code, and translates this into keyboard character code representing a keystroke pattern suitable for entering the data in a second receiving computer through its keyboard input port.

Once the sending computer has been configured to perform a printout, the printer cable is disconnected from the printer, and plugged into the module. Or in those cases where the printer cable includes a ground strap that is screwed into the printer, it may be convenient to have a second cable that is dedicated for use in connecting the module to the back panel connector printer output port. In either case the module connects the second input port to the printer output port.

The receiving computer is then configured to accept keyboard data and store it in its memory, and later to disk. For example, the IBM PC computer is supplied with a standard program called EDLIN which accomplishes this function. Another technique is to run a word processing program on the receiving computer and thus prepare it for receiving and saving typed information from the keyboard.

By starting a printout on the remote computer, text files can then be transferred from the remote computer to the module, converted to the appropriate keystroke pattern, and entered in the receiving computer. In addition to this, the third input port enables the entry of data in Morse code or any other suitable "on-off" code format. The external switch is activated to form desired Morse code or any other suitable "on-off" code characters, is inputted to the third input port of the module by means of the software stored in the micro-computer 80, and is converted to corresponding keyboard character code representing a desired keystroke pattern. The character code is sent to the keyboard input port of the receiving computer, thus enabling handicapped or otherwise disabled operators greater freedom.

Although the arrangement 100 employs both a second and third input port, it is within the inventive concepts contemplated herein to employ either one or both of the second and third input ports.

Figure 4:
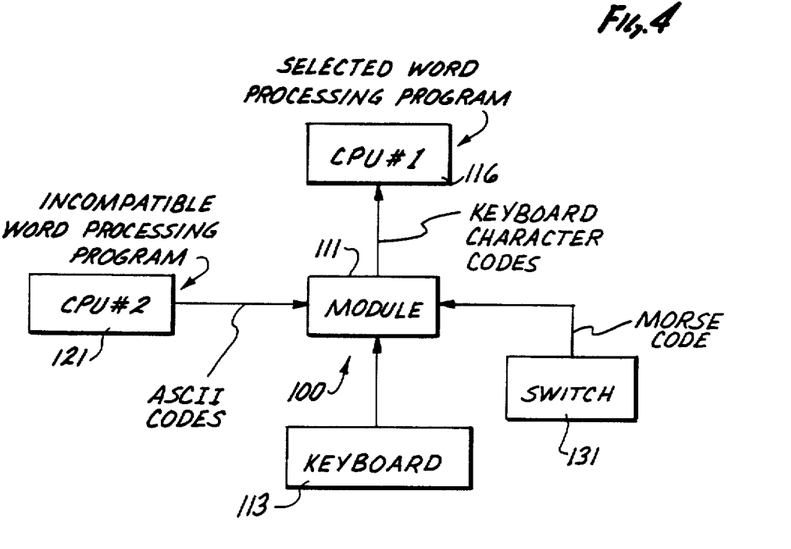
FIG. 4 is a symbolic block diagram, illustrating the flow of data between the components of FIG. 3.

Turning now to FIG. 4 there is shown a block diagram illustrating the data flow through the module 111. Keyboard 113 sends keyboard character code to the module, switch 131 sends Morse code or any other suitable "on-off" code to the module, CPU 2 designated reference 121 sends ASCII code to the module, and the circuitry and related programming within the module transmits keyboard character code to CPU 1 designated reference 116 of selected correspondence to these input signals.

Thus, the module can form a portion of a data transmission path between a selected keyboard and an associated processor unit without otherwise modifying or adding to the computer system. Although in its illustrated form, the module accepts a keyboard plug, and in turn, connects to a keyboard plug input port on the back panel of a conventional personal computer processor unit 116, it is within the inventive concepts herein disclosed to otherwise couple the module to the keyboard and computer system. For example, in those systems where the keyboard is coupled to the computer system by infrared signals, the module can be provided with input port connector means (not shown) for receiving infra-red keyboard signals from the keyboard with the output port connector means for transmitting corresponding infra-red signals to the computer processor unit.

In addition to the convenient way this module can be added to an existing system and to the handy manner in which it can record and generate keyboard character code representing selected keystroke patterns, it will become apparent to those skilled in the art that additional input ports may be included with related circuitry and programming for receiving signals in ASCII code or Morse code or any other suitable "on-off" code, and generating keyboard character code corresponding thereto.

Appendix B, which is incorporated herein by this reference, includes a listing of a computer program stored in the micro-computer. The program is suitable for transferring text files from a printer output port through the module into a keyboard input port. This program is stored in the memory of the micro-computer.

Figure 5:
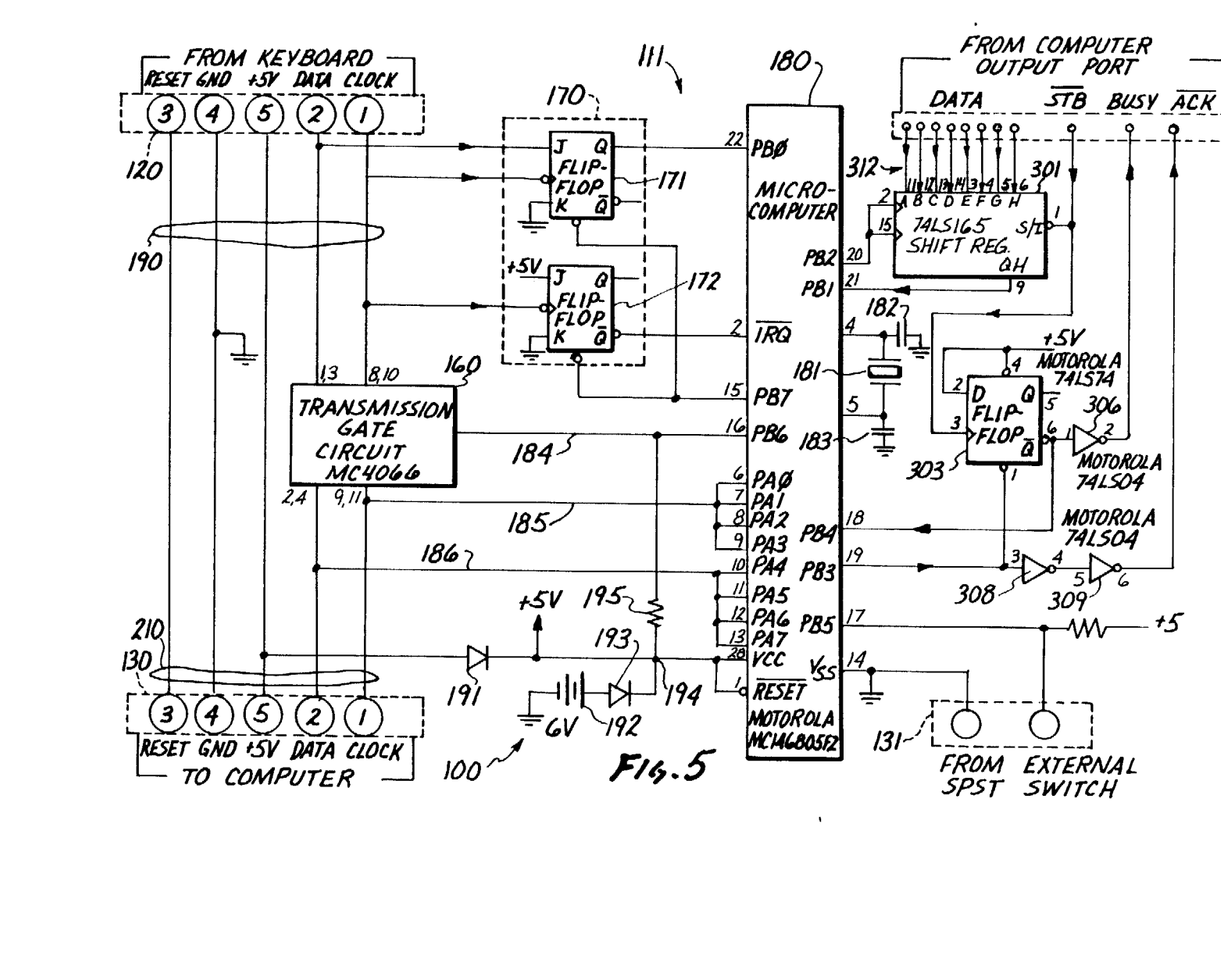
FIG. 5 is a schematic circuit diagram of the arrangement FIG. 3.

Considering now the utility arrangement 100 in greater detail with reference to FIG. 5, the arrangement 100 uses the same components and interconnections as shown in the arrangement 10 of FIG. 2, and in addition, it includes circuitry for coupling print code signals, such as ASCII print code signals, and Morse code or any other suitable "on-off" code signals to the micro-computer.

The utility arrangement 100 is generally similar to the arrangement 10 (FIG. 2), except for the components illustrated to the right of the micro-computer 180. Thus, only such components will now be described in greater detail.

Referring to FIG. 5, shift register 301, a flip-flop 303, and a set of inverters 306, 308 and 309, implement circuitry which appears to the computer 131 (FIG. 3) to be a printer interface port.

To send a character code to a printer, the computer places an ASCII character on the 8 Data lines, indicated at 312, and activates the negative pulse STB signal. This latches the data into the shift register via the LOAD input (pin 1), and also toggles the flip-flop 303, such that the BUSY line back to the computer becomes a high signal.

The computer reads the BUSY line, and delays sending the next character until this line returns to a low signal. This prevents sending data to the printer faster than the printer can receive it, and thus insures that characters are not lost.

The output signal from the flip-flop 303 also is routed to the "PB4" input of the microprocessor, where it is tested by the program for a LOW level. This indicates that a character is waiting in the shift register 301.

When this is detected, the microprocessor sends eight clock pulses from its output PB2, and reads the serial data which is clocked out of the shift register on input PB1. In this manner, it assembles an eight-bit byte and stores it in internal memory (not shown) of the microcomputer 180.

After the shift register has been read, the microprocessor sends a negative pulse from the PB3 output pin. This clears the flip-flop 303, thus setting BUSY LOW (indicating not busy), and also sends a negative pulse out through the inverters 308 and 309. This becomes the ACK pulse back to the computer, to acknowledge the receipt of the last character.

Some computers read the BUSY line for synchronization, some read the ACK pulse, and some read both. For this reason, both BUSY and ACK are implemented in the arrangement 100.

Various changes may be made in the form, construction, and arrangement of the procedures and parts described herein. For example, it will become apparent to those skilled in the art that the accessory of the present invention may employ an input port that can respond too on-off signals from various different types and kinds of input devices, including those disclosed herein, as well as bar code readers, and others. Therefore, without departing from the spirit and scope of the invention and without sacrificing any of its advantages, all matter herein is to be interpreted as illustrative and not in any limiting sense.

What is claimed is:

1. A computer accessory for coupling to an associated computer system having an input device, and for receiving input signals in a print code from a separate source, comprising:
    a module having a computer input port, a source input port and an output port;
    circuit means for generating selectively an output signal in keyboard character code at said output port, said output signal corresponding to an input signal in print code received from the separate source at said source input port or corresponding alternatively to a computer input signal received from the input device;
    means for converting said input signal in print code to said output signal in keyboard code;
    coupling means for enabling connection of said module in a data transmission path between the input device and said associated computer system, the input device being coupled to said computer input port, said coupling means for enabling alternatively said computer input device to send computer input signals through said accessory via said path to said output port;
    said coupling means for enabling alternatively converted input signals to be sent via said path to said output port;
    memory means responsive to computer input signals from said computer input device for storing a copy of said computer input signals therein as said input signals are being supplied to said output port; and
    memory read-out means for supplying subsequently the stored copy of said computer input signals from said memory means via said data transmission path to said output port.

2. A device as recited in claim 1, further comprising: said input device being a keyboard;
    keyboard coupling means for coupling a keyboard signal from the keyboard to the input port; and
    computer coupling means for coupling the output signal from the output port to a selected computer input port.

3. A device as recited in claim 2, further comprising: keyboard connector means for enabling connection of a selected keyboard cable plug to the module; and
    computer connector means for enabling connection of the module to a selected computer system in place of the keyboard cable plug.

4. A device as recited in claim 1, further comprising: said circuit means for generating said output signal in keyboard character code that is of correspondence to input signals in ASCII code received from the separate source at said source input port.

5. A device as recited in claim 4, further comprising: second input coupling means for coupling a second input signal in ASCII code from a selected source to the second input port.

6. A device as recited in claim 5, further comprising: second input connector means for enabling connection of a selected printer cable to the module.

7. A device as recited in claim 4, further comprising:

a third input port; and third circuit means for generating a third output signal in keyboard character code that is of selected correspondence to a third input signal in Morse code or any other suitable "on-off" code received from a separate source at the third input port.

8. A device as recited in claim 7, further comprising:

third input coupling means for coupling a third input signal in Morse code or any other suitable "on-off" code from a selected source to the third input port.

9. A device as recited in claim 8, further comprising:

third input connector means for enabling connection of a selected miniature phono plug to the module.

10. A device as recited in claim 1, wherein the circuit means comprises:

micro-computer circuit means coupled to the input port for sensing a predetermined input keystroke pattern and generating a corresponding output keystroke pattern.

11. A device as recited in claim 1, wherein said circuit means further comprises:

direct coupling means for selectively coupling an input signal received at one of said input ports to the output port; and disabling means for selectively disabling the direct coupling means to enable transmission of said output signal to said output port.

12. A device as recited in claim 10, further comprising:

programming means for enabling the generation of an output keystroke pattern of desired correspondence to an input signal in keyboard character code.

13. A device as recited in claim 10, further comprising:

programming means for enabling the generation of an output keystroke pattern of desired correspondence to an input signal in ASCII code.

14. A device as recited in claim 10, further comprising:

programming means for enabling the generation of an output keystroke pattern of desired correspondence to an input signal in Morse code or any other suitable "on-off" code.

15. A device as recited in claim 1, wherein said input signal is an on/off signal.

16. A device as recited in claim 1, wherein said input signal is an on/off signal.

17. A device as recited in claim 8, wherein said input signal is an on/off signal.

18. A device as recited in claim 9, wherein said input signal is an on/off signal.

* * * * *